United States Patent
Cohen

(10) Patent No.: US 7,685,193 B2
(45) Date of Patent: Mar. 23, 2010

(54) DATABASE SYSTEM WITH MULTIPLE PROCESSING NODES

(75) Inventor: Ben Cohen, Bracknell (GB)

(73) Assignee: Kognitio Limited, Marlow, Bucks (GB)

( * ) Notice: Subject to any disclaimer, the term of this patent is extended or adjusted under 35 U.S.C. 154(b) by 187 days.

(21) Appl. No.: 11/414,068

(22) Filed: Apr. 28, 2006

(65) Prior Publication Data

US 2007/0276788 A1    Nov. 29, 2007

(51) Int. Cl.
*G06F 7/00* (2006.01)
(52) U.S. Cl. .................................. 707/714; 707/770
(58) Field of Classification Search ............. 707/1–10, 707/100–102, 104.1
See application file for complete search history.

(56) References Cited

U.S. PATENT DOCUMENTS

| | | | | |
|---|---|---|---|---|
| 5,121,494 | A * | 6/1992 | Dias et al. ........................ | 707/2 |
| 5,247,662 | A * | 9/1993 | Minemura et al. ............... | 707/2 |
| 5,765,146 | A * | 6/1998 | Wolf et al. ....................... | 707/2 |
| 5,797,000 | A * | 8/1998 | Bhattacharya et al. .......... | 707/2 |
| 5,884,320 | A * | 3/1999 | Agrawal et al. ............ | 707/104.1 |
| 6,092,062 | A * | 7/2000 | Lohman et al. .................. | 707/2 |
| 6,112,198 | A * | 8/2000 | Lohman et al. .................. | 707/3 |
| 6,609,131 | B1 * | 8/2003 | Zait et al. ..................... | 707/102 |
| 7,020,661 | B1 * | 3/2006 | Cruanes et al. ............ | 707/103 R |
| 7,054,852 | B1 * | 5/2006 | Cohen ............................. | 707/2 |
| 7,080,072 | B1 * | 7/2006 | Sinclair ........................... | 707/6 |
| 7,085,769 | B1 * | 8/2006 | Luo et al. .................... | 707/102 |

OTHER PUBLICATIONS

Yu, et al., "Algorithms to Process Distributed Queries in Fast Local Networks", IEEE Transactions on Computers, vol. C-36, No. 10, Oct. 1987, p. 1153-1164.*

* cited by examiner

*Primary Examiner*—Neveen Abel Jalil
*Assistant Examiner*—Vei-Chung Liang
(74) *Attorney, Agent, or Firm*—Park, Vaughan & Fleming LLP

(57) ABSTRACT

A method and apparatus are provided for distributing a database join operation across a plurality of processing nodes. The database join operation is performed between a first table having M1 rows and a second table have M2 rows and involves forming M1×M2 combinations of rows from the first and second tables. The method includes allocating across the plurality of processing nodes the M1×M2 combinations of rows from the first and second tables. Each of the M1×M2 combinations is present on one of the nodes, and each node stores combinations corresponding to a subset of the M1 rows from the first table and a subset of the M2 rows from the second table. The method further comprises performing for each processing node the join operation in respect of all combinations of rows allocated to that processing node and collating results across all the processing nodes to complete the join operation.

6 Claims, 2 Drawing Sheets

DATABASE SYSTEM WITH MULTIPLE PROCESSING NODES

FIELD OF THE INVENTION

The present invention relates to performing database operations in a database system having multiple processing nodes.

BACKGROUND OF THE INVENTION

A common operation on a relational database is to join two tables (relations): $A=\{a_1, a_2, \ldots, a_n\}$ and $B=\{b_1, b_2, \ldots, b_m\}$, where $|A| \leq |B|$. Notionally, this is achieved by firstly forming the Cartesian product of the two tables to produce a table $T=A \times B = \{a_i b_j | a_i \in A, b_j \in B\}$. Thus if A contains I tuples and N attributes and B contains J tuples and M attributes, T contains (I*J) tuples and (N+M) attributes. Secondly, we apply the join condition $\theta$ to each row in T, eliminating rows that do not match to form a result table $J=\{T_i | \theta(T_i)\}$.

As an example of a join operation, table A may represent a listing of customers, complete with customer name, number and address, while table B may represent a listing of pending orders, with order number, product, and customer number. In this example, the join operation may match customer number from table A and B to provide a table of orders, with the customer name and address being provided for each order. Note that in this example the join condition (predicate) is simple equality of customer number between the two tables, but in other cases a more complicated predicate may be used. For example, the customer table may include a current balance value and a credit limit value, while the order table may include an order value. In this case, in addition to the join on customer number, the predicate may include the condition that the order value plus current balance is less than the credit limit.

When forming T, each row from A must be paired with each row from B exactly once. If a row from A is paired with a row from B more than once, we will get duplicate rows in T and therefore maybe in J. If a row from A is not paired with a row from B, then it will be missing in T and therefore in J.

As recognised in "Database Systems" by Connolly, Begg and Strachan, Addison-Wesley, 1996, ISBN 0-201-422787-8 (see especially page 104), a join operation is one of the most difficult operations to implement efficiently in a relational database management system (RDBMS), and this can lead to performance problems. In a single processor system, the join operation can be implemented in a relatively straightforward manner, for example by iteration over the rows of table A and table B. However, the use of such a single processor system may not provide satisfactory overall performance, especially in situations where tables A and/or B may be very large.

The $WX_2$ product from Kognitio Ltd is based on the use of many parallel processors (nodes) to provide greatly improved performance for database operations. Distributing database operations across many processors provides a very powerful, scalable and cost-effective solution. However, when using a distributed or parallel solution for performing join operations, great care is required to ensure that each row from the first table is paired once and only once with each row from the second table.

One approach for a distributed join operation is to use a replicated distribution for the smaller table, and a partial distribution for the larger table. In the replicated distribution, the smaller table is copied in its entirety to each node: $N_1, N_2, \ldots N_n$. In the partial distribution, each row of the larger table is sent to one (and only one) node. The allocation of rows to nodes may be made via any suitable mechanism—e.g. on a random basis, a round-robin scheme, or using a hash calculated for each row. If the different nodes are of (approximately) equal processing capability, then it is generally desirable to assign approximately the same number of rows from the larger table to each node. In this case, using a hash might not give a uniform assignment, depending on the data, and so may not be appropriate in such circumstances.

Suppose table A is replicated and table B is partially distributed. Each row $b_i$ is on one (and only one) node, and can be joined to every row in A because a copy of A is on each node. This then allows each pair of rows from table A and table B to be joined exactly once (as required). To select all the rows from the partial distribution (table B), we would select all the rows from each of the nodes. To select all the rows from the replicated distribution (table A), we would select all the rows from one of the nodes.

In the partial/replicated approach, each node contains $|A|$ rows from A and $|B|/n$ rows from B (where n is the number of nodes in the system). The processing requirements for this approach can then be represented as:

Time: $O(|A||B|/n)$

Space on each node: $O(|A|+|B|/n)$

Total space: $O(n|A|+|B|)$

In a conventional distributed system, each processing node is provided with local memory, and also has access to disk storage (whether local or shared). Since data access from memory is much faster than from disk, it is highly desirable for each node to be able to hold the replicated version of table A and the partial version of table B in memory. If $O(|A|+|B|/n)$ exceeds the available memory due to the size of the (partially) stored table B, then this can be addressed by adding more nodes to the system (increasing n decreases $|A|+|B|/n$). On the other hand, if no more nodes are available, or if the available memory capacity is exceeded due to the size of table A, then disk storage can be used to hold the additional data, although this will have a significant impact on processing efficiency. This is especially a problem for in-memory databases that are optimised for tables that are small enough to fit in memory to avoid disk or inter-node I/O where possible.

One way to reduce overall storage requirements is to provide shared memory for at least some subsets of the nodes. The nodes in the subset can then share the replicated table rather than having multiple copies (one for each node). Assuming that the shared memory access is not slower than normal memory access, this reduces overall storage requirements. However, this approach is only applicable for systems with such a shared memory architecture.

Another possible approach for addressing storage issues is by using column indices for the tables to perform the join operation. Thus in the example mentioned above involving a customer table and an order table, if there were an index over customer number for both tables, these indices could be used instead of the whole tables to identify which rows (tuplets) to include in the output table. However, the use of indices brings its own problems, such as increased storage requirements, and also limited flexibility (since indices are usually only provided for selected attributes).

A special case arises for equi-joins, in which the join condition $\theta$ is a conjunction comprising one or more conditions of the form E1=E2, where E1 is an expression using columns only from table A and E2 is an expression using columns only from table B (the customer-order example given above is an equi-join). In such circumstances, it is possible to use a Hashed-{Fi} distribution across both tables to provide a better allocation of the data sets across the nodes. In particular, assuming a good hash function H, a table T and a set of expressions {Fi} using columns of T, each row from T may be sent for the join operation to the node calculated as a function of H({Fi}), for example to node $N_h$, where h=H({Fi}) mod n+1.

Consider therefore the situation where table A is Hashed-$\{A_1,A_2\}$ and table B is Hashed-$\{B_1,B_2\}$, and we wish to join them using the condition: $A_1=B_1 \wedge A_2=B_2$. For each pair of rows $a_i$, $b_j$ where the join condition is true, the hashes $H(\{A1, A2\})$ and $H(\{B1,B2\})$ are equal. Consequently, both of these rows will be on the same node, thereby allowing the join to be detected and performed. Furthermore, these rows will not occur on any other nodes, and so each pair of rows will join exactly once as required.

As an example of this approach, consider the customer-order join mentioned above. In this case, the hashing would be performed on customer number for both tables, so that all rows having a given customer number would end up on the same processing node (irrespective of whether the row originated from the customer table or from the order table). Consequently, the join could be performed just by having each node compare the rows hashed to that particular node.

For an average case with a fairly uniformly hashed set of data, each node would be allocated approximately $|A|/n$ rows from table A and $|B|/n$ rows from table B. This leads to the following processing requirements:

Time: $O(|A||B|/n^2)$

Space on each node: $O((|A|+|B|)/n)$

Total space: $O(|A|+|B|)$

Note that these processing requirements are advantageous compared to the partial/replicated approach. Furthermore, since table A is now distributed across the nodes as well as table B, tables of any size can be accommodated by the addition of further processing nodes.

Although hashing both tables can be very effective, there are many situations where it does not produce such good results, or cannot be applied at all. For example, if the data does not hash uniformly, a few nodes will have a disproportionate number of rows, thereby reducing efficiency (since the remaining nodes are operating below capacity). Furthermore, such an approach does not scale well to large tables, since all the rows are in effect restricted to a small, fixed number of nodes. As an example, such a problem might arise for an equi-join with few ($\leq \sqrt{n}$, where "$\sqrt{}$" denotes the square root operator) distinct values such as TRUE/FALSE or days of the week. In such circumstances, the hashed approach may actually provide a less effective solution than the partial/replicated approach described above.

Furthermore, the hashing approach is restricted to certain types of predicate, and cannot be used with other types of predicate such as $\leq$ or "between". This is because with such a predicate, it cannot be ensured that rows that satisfy the predicate will both hash to the same node. For example, there may be a range of attribute values that satisfy a given predicate, and the hash may assign such a row to one of various possible nodes, depending on the particular value of the attribute within the range. Accordingly, this type of join must use the partial/replicated approach set out above, despite the problems that can arise, especially with very large data sets.

SUMMARY OF THE INVENTION

Accordingly, one embodiment of the invention provides a method of distributing across a plurality of processing nodes a database join operation between a first table having M1 rows and a second table having M2 rows. The join operation involves forming M1×M2 combinations of rows from the first and second tables. The method comprises allocating across the plurality of processing nodes the M1×M2 combinations of rows from the first and second tables, such that each node stores a subset of the M1 rows from the first table and a subset of the M2 rows from the second table, and each of the M1×M2 combinations is present on one (and only one) of the nodes. The join operation is then performed for each processing node in respect of all combinations of rows from the subsets of rows allocated to that processing node. The results across all the processing nodes are then collated to complete the join operation.

This approach is distinguished from the partial/replicated approach in that each node only stores a subset of the two tables being joined rather than storing a whole table (as per the replicated distribution). Accordingly, even very large tables can be accommodated by spreading the tables across multiple processing nodes. The approach is also distinguished from the hashing distribution described above, in that each of the M1×M2 combinations is allocated at least nominally to a processing node. (In fact, the present approach may be supplemented by the use of hashing as described below).

The approach is efficient in terms of storage, since for each node the join operation is performed in respect of all combinations of rows from the subsets of rows allocated to that processing node. Furthermore, any given combination of rows is only stored on a single node.

There are various configurations available for allocating the rows of the tables to the nodes. The choice of configuration, and the precise allocation within the configuration, can be matched to the processing capabilities of the available nodes and/or to the expected processing requirements of the data. One particular configuration or distribution is where the processing nodes are arranged (logically) in a rectangular grid. The M1 rows from the first table are then allocated in accordance with a lateral distribution, in which all the processing nodes in a row of the grid are allocated the same subset of rows from the first table. This lateral distribution has the benefit that it is relatively straightforward to implement. The M2 rows from the second table may also be allocated in accordance with a lateral distribution, such that all the processing nodes in a column of the grid are allocated the same subset of rows from the second table. This rectangular arrangement for the nodes ensures that the lateral distribution of the second table is orthogonal to the lateral distribution of the first table.

In other embodiments, the first and/or second tables may be allocated to nodes in accordance with some distribution other than a lateral distribution. This can lead to greater flexibility, for example in matching workload to node processing capabilities (e.g. for a heterogeneous population of nodes), but it is more involved to then ensure that the overall allocation conditions are met (i.e. that each row combination appears on one and only one node).

In some embodiments, the rows from the first and second tables are assigned into subsets on a random basis, while in other embodiments, the rows are assigned into subsets using a hash function. In the latter case, it may be feasible to determine from the hash function that certain combinations of rows from the first and second tables are inactive in that they cannot fulfil a condition of the join operation. In this case, the join operation need not be performed in respect of such inactive combinations, and it may be feasible to re-assign the resources of the relevant node(s).

The approach described herein can be generalised to joins of more than two tables by providing a method of distributing across a plurality of processing nodes a database join operation between N tables. Each table is assumed to have M(k) rows (k=1, ... N), and the join operation involves forming M(1)×M(2)× ... M(k) combinations of rows from the N tables. The method comprises allocating across the plurality of processing nodes the combinations of rows from the N tables, such that each node is allocated a subset of rows from each table, and each of the combinations is present on one and only one of the nodes. The method further comprises performing for each processing node the join operation in respect of all combinations of rows from the subsets of rows allocated to that processing node. The results are then collated across all the processing nodes to complete the join operation.

Other embodiments of the invention provide apparatus (e.g. a computing system), a computer program, and a computer program product (e.g. comprising instructions on a medium) for implementing the methods described above.

The approach described herein provides a new way to distribute or partition data from two large sets on a possibly shared-nothing multiple node system in order to perform a Cartesian join involving every possible pairing of elements from both sets. The approach generally involves the same time but much less space than a typical partial/replicated implementation. One particular benefit of the approach is that it addresses the problem where the replicated set is too large to fit into a single node. In certain cases where particular constraints are placed on the resulting set and certain conditions are known to hold for the data, the distribution of data to the nodes can be refined or enhanced to reduce time and space requirements further.

BRIEF DESCRIPTION OF THE DRAWINGS

Various embodiments of the invention will now be described in detail by way of example only with reference to the following drawings.

DETAILED DESCRIPTION

Figure 1:
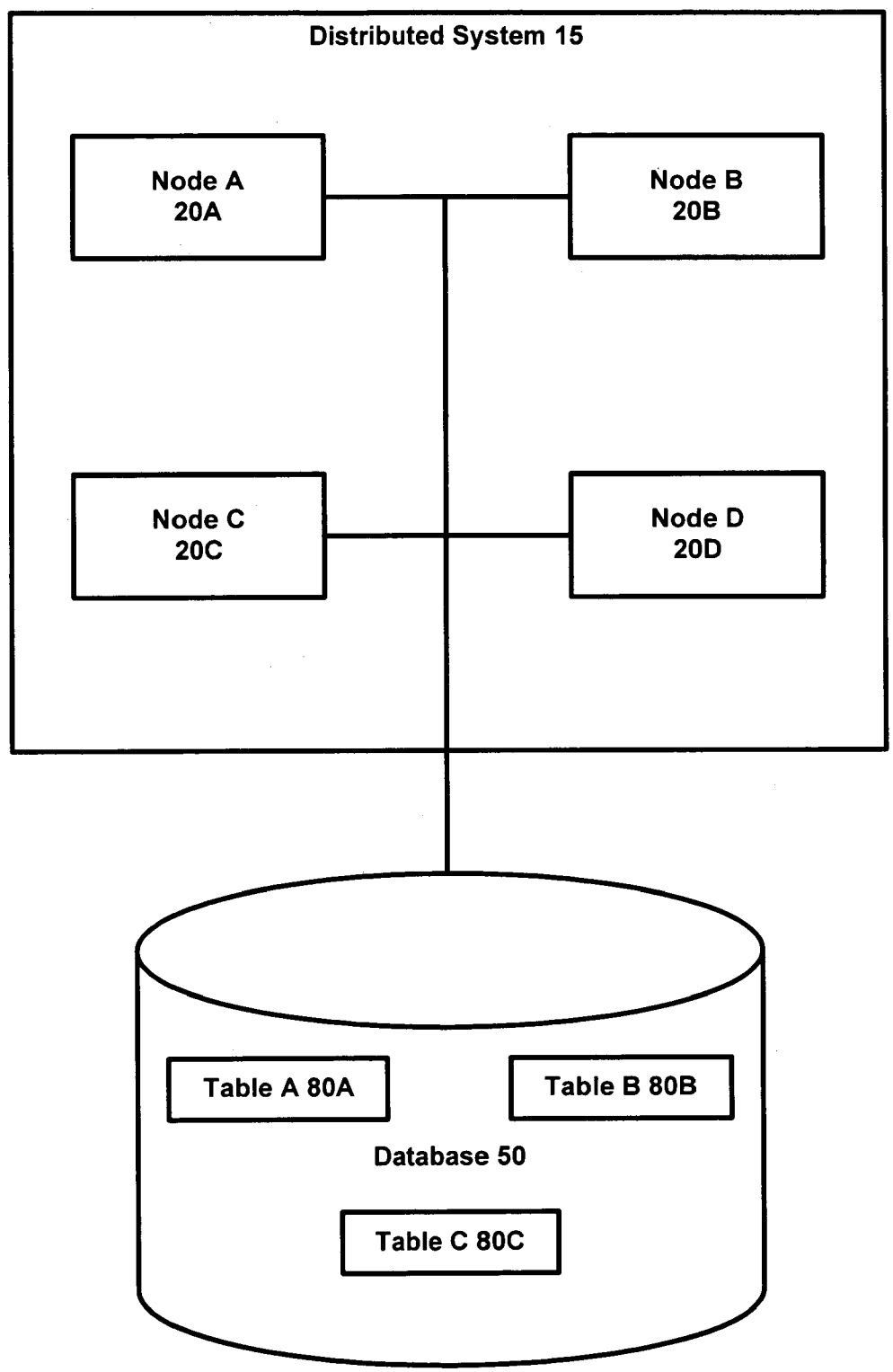
FIG. 1 is a schematic diagram of a database system and a distributed processing system in accordance with one embodiment of the invention.

In accordance with one embodiment of the invention, we define two new distributions, horizontal-p and vertical-p, where p may be chosen according to the relative sizes of table A and table B, and generally $1 \leq p \leq \sqrt{n}$. In one implementation, $p=\sqrt{(n|A|/|B|)}$ (for reasons that are explained below) but other values for p may be used if more convenient. For example, a different value for p might be used to allow p to divide n exactly, or to match the distribution of an existing table, or if the rows of A and B have very different sizes (as explained in more detail below). Note that table A and B may each be too large to fit into the memory of a single node.

A value of q is chosen such that $q=int(n/p)$. The first pq nodes are then labelled as:

$N_{11}, N_{12}, \ldots, N_{1p}$, $N_{21}, N_{22}, \ldots, N_{2p}$,

...

...

$N_{q1}, N_{q2}, \ldots, N_{qp}$

The remaining $r=n \mod p$ ($<p$) nodes are excluded from the processing.

We define the "horizontal groups" as $H_i=\{N_{ij}|1 \leq j \leq p\}$, that is, the rows in the table above, and the "vertical groups" as $V_i=\{N_{ji}|1 \leq j \leq q\}$, that is, the columns in the table above.

A horizontal-p distribution of a table A is defined as having the N nodes split into q horizontal groups each containing p nodes. Every node in each horizontal group has the same set of rows from the table, and each row from the table occurs in exactly one horizontal group. Each vertical group contains among its nodes (in aggregate) a copy of table A, with no rows duplicated. In particular, the rows of table A are divided into q groups of approximately equal size, $A_1, \ldots, A_q$, for example at random, and rows of $A_1$ are assigned to the first node $N_{1i}$ in every vertical group $H_i$, the rows of $A_2$ to the second node $N_{2i}$ in the vertical group, and so on.

A vertical-p distribution of a table B is similar, but orthogonal to the horizontal-p distribution, in that the nodes are split into p vertical groups each containing q nodes. Every node in each vertical group has the same set of rows from table B, and each row from table B occurs in exactly one vertical group. Each horizontal group contains among its nodes a copy of table B, with no rows duplicated. The rows of table B are divided into p groups of approximately equal size, $B_1, \ldots, B_p$, at random (for example), and the rows of $B_1$ are assigned to the first node $N_{i1}$ in every horizontal group $V_i$, the rows of $B_2$ to the second node $N_{i2}$, and so on.

If we consider joining table A, which has a horizontal-p distribution and table B, which has a vertical-p distribution, for all the nodes containing the row $a_i$, there is exactly one node with $b_j$ (and vice versa). As a result, each pair of rows is joined exactly once as required.

On each node there are $|A|/p$ rows from table A and $|B|p/n$ rows from table B, so that the processing requirements for this approach are:

Time: $O(|A||B|/n)$

Space on each node: $O(|A|/p+|B|p/n)$

Total space: $O(|A|n/p+|B|p)$

Note that any value of p will give the correct results in terms of the join operation, and in addition the time taken is independent of p. However, the space needed is dependent on p, and the value of p selected above is aimed at minimising this space requirement. In particular, adopting the value of $p=\sqrt{(n|A|/|B|)}$ leads to the following processing requirements:

Time: $O(|A||B|/n)$

Space on each node: $O(\sqrt{(|A||B|/n)})$

Total space: $O(\sqrt{(n|A||B|)})$

Surprisingly, this results in a total space requirement less than or equal to that for the partial/replicated case, since $\sqrt{(|A||B|/n)} < n|A|+|B|$.

If p=1 the horizontal groups each have one node, so that this reduces to the partial/replicated solution, in which horizontal-1=partial and vertical-1=replicated—i.e. table A has a partial distribution and table B has a replication distribution. However, if table A and table B have similar sizes, and taking the value of $p=\sqrt{(n|A|/|B|)}$ suggested above, there can be a significant reduction in space requirements for the horizontal/vertical approach. For example, with n=100 nodes and tables A and B having with $10^6$ rows each, the partial/replicated join uses over $10^6$ rows on each node, whereas the horizontal/vertical join uses only $2 \times 10^5$ rows.

It has been generally assumed so far that the rows of A are approximately the same size as the rows of B. However, this may not necessarily be the case. In such circumstances, a different value of p may be adopted, namely $p=\sqrt{(n|a||A|/|b||B|)}$, where $|a|$ is the size of one row of table A and $|b|$ is the size of one row of table B. This ensures that for each node there is approximately the same amount of data from table A as from table B, since for this value of p, $|A||a|/p=|B||b|p/n$.

In addition, it has been generally assumed so far that all the n nodes are equal in terms of their processing and/or space provisions. However, some implementations may involve a heterogeneous population of nodes, in which case the allocation of rows to the various nodes can be weighted to take into account nodes that are faster or have more memory than other nodes. Another possibility is that some subset(s) of the nodes can share memory. In such circumstances, the nodes $N_{11}, \ldots, N_{qp}$ may be labelled to derive the most benefit from this sharing. In particular, a subset of nodes with shared memory may be placed within the same vertical or horizontal group, so that rows that are provided in common to each node within that group need only be entered into the shared memory once for the subset.

It will be appreciated that for the horizontal/vertical approach, the memory used on each node is inversely proportional to the number of nodes (n). Consequently, if there is a lack of memory on the nodes, this can be addressed by adding further nodes. If necessary, as for the partial/replicated case, disk space may still be used for extra storage, and/or data may be cycled between nodes (in the horizontal and vertical groups).

In general a horizontal-p distributed table cannot be joined with a vertical-p' distributed table, if p≠p'. In general, a horizontal-p table as defined above cannot be joined with other distributions, such as partial or hashed, except in particular circumstances. For example, a vertical-p table may be joined to a replicated table by using the nodes from one horizontal group, where the replicated table is present in its entirety on each node within the horizontal group. This reflects the fact that to select all the rows from a vertical-p distribution, one would select all the rows from each of the nodes in any one horizontal group, while to select all the rows from a horizontal-p distribution, one would select all the rows from each of the nodes in any one vertical group.

The horizontal-p and vertical-p distributions defined above have ignored the last r nodes, but in some implementations, this failure to use all available resources may not be acceptable, especially for small n. In order to address this situation, analogous distributions horizontal F-p and vertical F-p can be defined, where p is chosen as before. A horizontal F-p distribution of a table A is also split into "horizontal groups" as before, with the extra nodes being used either to form an extra horizontal group (e.g., if r≈p), or added singly to the first r horizontal groups. Rows are then allocated to every node in one horizontal group, for example at random, where the allocation is weighted so that the horizontal groups with more nodes get more rows. The weighting is arranged so that there is an approximately constant time and/or space requirement for each node.

A vertical F-p distribution of a table B is again orthogonal to the horizontal F-p distribution, although since the horizontal groups now vary in size, it is not possible to define the vertical groups in the same way as previously. For each horizontal group the rows from table B are assigned to one node within that group at random. Consequently, to select all the rows from a vertical F-p distribution, one would select all the rows from each of the nodes in any one horizontal group. In contrast, to select all the rows from a horizontal F-p distribution, one would select all the rows from any one of the nodes in each horizontal group.

The horizontal F-p distribution and the vertical F-p distribution produce exactly one node where both $a_i$ and $b_j$ occur. Consequently, table A with a horizontal F-p distribution, can be joined with table B, which has a vertical F-p distribution. The behaviour in respect of such a join is generally similar to that for the horizontal-p and vertical-p distributions as discussed above, although precisely balancing the join across the various nodes may be slightly more complex.

In some cases, the distributions of the tables across the nodes may be impacted by knowledge about the data or the join condition having a certain form. For example, consider the customer-order tables situation discussed above, where a customer table may include a current balance value and a credit limit value, while the order table may include an order value. In addition to the join on customer number, the predicate may include the condition that the order value plus current balance is less than the credit limit. In such circumstances, rows of the customer table can be allocated to nodes based on the value of credit limit minus current balance (=a1), and the rows of the order table can be allocated to nodes based on the order value (=b1). If a horizontal group $A_1$ has a1<Z (say) for all rows in the group, and a vertical group $B_1$ has b1>Z (say) for all rows in the group, then it is not possible for a pair of rows from groups $A_1$ and $B_1$ to fulfil the predicate condition, since we are only interested in a possible match where a1>b1. Consequently, there is no need to store the combination of groups $A_1$ and $B_1$ onto a node, or at least to process the combination of such groups if the data is already stored onto the node (for example for handling another predicate calculation). Note that in such circumstances, and depending on the data and the condition, the horizontal-vertical distributions may approach the efficiency of the hashed distribution discussed above.

An analogous approach may also be used for equi-joins where the join is on just a few values (for instance, for TRUE and FALSE, or days of the week). This allows the storing and/or processing to be performed only on certain combinations of nodes where the predicate condition can be fulfilled (but where a given value is not necessarily restricted to being located on a single node, unlike for a hashed distribution). For example, if the join is on a TRUE/FALSE value, one strategy would be to split the nodes into two sets; one set joins all the rows with the value TRUE (using horizontal/vertical) and the other set joins all the rows with the value FALSE (using horizontal/vertical). This ensures that there is no need to compare FALSE with TRUE or vice-versa, and could halve the memory and number of comparisons needed.

Although the joins mentioned so far have been 2-way joins, that is a join between two tables, more generally an n-way join may be desired. For example, if table A is a customer table and table B is an order table (as before), a third table (table C) may represent an invoice table. Thus each invoice in table C may be associated with a customer number from the customer table, plus an amount, date, and settlement date. The join between the order and customers may include the condition that the customer does not have any outstanding (i.e. unsettled) invoices over three months old. This then requires a three-way join between the order table, the customer table, and the invoice table.

One way of performing an n-way join is to perform a sequence of 2-way joins. However, it may be better to join more than two tables at the same time in a t-way join, for example if there is a complicated join condition involving columns from several tables, or because it may use less memory. If one of the tables is large, but the others to be joined will fit into memory, this t-way join can be accomplished by giving the large table a partial distribution and the other tables a replicated distribution. As the large table gets bigger, this can be accommodated by adding more nodes to the system, but such a solution is not available if the other tables get too big.

If two of the tables are large, but the other tables to be joined fit into memory, the large tables can be given horizontal-p and vertical-p distributions and the other tables a replicated distribution. Again, as either of the first two tables gets bigger, this can be accommodated by adding more nodes to the system, but this approach is not available if one of the other tables gets too big.

In such circumstances, the horizontal and vertical distributions can be generalised to additional dimensions by splitting the rows of each of the t tables T1, T2, ..., Tt, and the nodes in the system into groups in an analogous way. For example, if all the tables are roughly the same size |T|, then a distribution can be defined for each of the tables, Lateral-$t_1$, ..., Lateral-$t_t$. Defining $p = \sqrt[t]{n}$, and relabelling the first p' nodes as $\{N_{ij\ldots m} | i, j, \ldots, m \in [1, p]\}$, each table $T_u$ is split into p equal parts $(T_u)_1, \ldots, (T_u)_p$, for example, on a random basis. The part $(T_u)_v$ is then allocated to the nodes in the v-th lateral group $\{N_{i(1)i(2)\ldots i(t)}|i(u)=v, i(k)\in[1, p]\forall k\neq u\}$. Consequently, the time taken for performing the join is $O(|T|t/n)$ and the space required on each node is $O(n^{-1/t}|T|)$. Therefore, if any of the tables gets too big, this can be accommodated by adding new nodes.

An n-way join using lateral distributions uses less memory than the equivalent sequence of (n−1) 2-way joins where rows are not eliminated before the last join because the last 2-way join uses $O(n^{-1/2}|T|^{3/2})$ memory per node. However, an equivalent sequence of 2-way joins is likely to be faster and use less memory if the early steps in the sequence eliminate a large number of rows (because of a condition).

In other implementations, slight modifications may be made to the definition of a lateral distribution, as with the horizontal and vertical distributions. For example, such modifications may allow use of the n−p$^t$ nodes that are not used above, and/or the sizes of the lateral groups of nodes may be altered to accommodate tables of different sizes.

Tables 1-3 illustrate how a join operation for tables A and B can be distributed across various nodes N1, N2, ... N6 in accordance with various embodiments of the invention. Each table comprises 8 rows, a1, a2 ... a8 and b1, b2, ... b8. Note that the labelling of the rows as a1, a2, ... a8 does not necessarily correspond to the ordering of the rows in table A itself. For example, if the ordering of the rows in table A is denoted A1, A2, ... A8, then any appropriate one-to-one mapping can be used for Ai→aj. This mapping may be done or a random basis, or by hashing some table attribute(s), or according to some mathematical or logical relationship such as j=i or j=i+4 mod 8. The mapping used for table B may be the same as or different from the mapping used in respect of table B.

(It will be appreciated that in practice, the number of rows in tables A and B will be very much greater than 8, and also the number of available nodes is likely to be greater than 6. In addition, the number of rows in table A may be different from the number of rows in table B).

TABLE 1

|    | a1 | a2 | a3 | a4 | a5 | a6 | a7 | a8 |
|----|----|----|----|----|----|----|----|----|
| b1 | N1 | N1 | N1 | N3 | N3 | N5 | N5 | N5 |
| b2 | N1 | N1 | N1 | N3 | N3 | N5 | N5 | N5 |
| b3 | N1 | N1 | N1 | N3 | N3 | N5 | N5 | N5 |
| b4 | N2 | N2 | N2 | N4 | N4 | N6 | N6 | N6 |
| b5 | N2 | N2 | N2 | N4 | N4 | N6 | N6 | N6 |
| b6 | N2 | N2 | N2 | N4 | N4 | N6 | N6 | N6 |
| b7 | N2 | N2 | N2 | N4 | N4 | N6 | N6 | N6 |
| b8 | N2 | N2 | N2 | N4 | N4 | N6 | N6 | N6 |

Table 1 is in the form of a rectangular grid, where each column corresponds to a row from table A and each row corresponds to a row from table B. The grid square at the intersection of a given column and row indicates the node on which the join operation for that combination of row from table A and row from table B is to be performed. For example, the combination of a2 and b4 is located and processed on N2 (node 2), while the combination of a5 and b7 is located and processed on N4. It will be appreciated from the grid of Table 1 that every combination of rows from table A and table B is therefore processed on one and only one node, as required for proper performance of the join operation.

Note also that the domain of each node in Table 1 corresponds to a rectangle within the grid of Table 1. This arises because each node stores a subset of rows from table A and a subset of rows from table B, and then processes every possible combination of rows from these two subsets. For example node 3 stores rows a4 and a5 from table A and rows b1, b2, and b3 from table B, and is therefore responsible for processing the six (2×3) combinations a4b1, a4b2, a4b3, a5b1, a5b2, a5b3. The allocation of rectangular domains to the nodes is efficient, since each node is responsible for processing every combination of rows for which it is storing the relevant data, thereby helping to minimise overall data storage requirements across the nodes.

The node allocation of Table 1 corresponds to a horizontal-vertical distribution. Note that it is arbitrary whether we regard table A as being vertically distributed and table B as being horizontally distributed or vice versa. In other words, from a logical perspective and in respect of a single table, a horizontal distribution is the same as a vertical distribution. Thus in generic terms, we can regard both a horizontal distribution and a vertical distribution as a form of lateral distribution. Such a lateral distribution occurs where we split the rows of a table C into M groups, C1, C2, ... CM. Each row is present in one and only one group, and at least one of the groups includes two or more rows. The available processing nodes are likewise split into M groups, $P_1, P_2, \ldots P_M$. Again, each node is present in one and only one group, and each group contains the same number of two or more rows. The lateral distribution then provides that all the rows of group $C_i$ are stored on each and every node of group $P_i$ (for all $1 \leq i \leq M$).

Thus in respect of Table 1, the lateral distribution of table A involves splitting:
(a) the rows of table A into three groups, a1–a3; a4–a5; and a7–a8, which we can denote respectively by A(1), A(2), and A(3); and
(b) the nodes into three corresponding groups each of two nodes, N1–N2; N3–N4; and N5–N6, which we can denote respectively by N(1), N(2) and N(3). The lateral distribution of table A in Table 1 then involves assigning row group A(1) to processor group N(1), row group A(2) to processor group N(2), and row group A(3) to processor group N(3).

Table 1 also has a lateral distribution for table B, which involves splitting:
(a) the rows of table B into two groups, b1–b3 and b4–b8, which we can denote respectively by B(1) and B(2); and
(b) the nodes into two corresponding groups each of three nodes, N1, N3 and N5; and N2, N4 and N6, which we can denote respectively by N(1) and N(2). The lateral distribution of table B in Table 1 then involves assigning row group B(1) to processor group N(1) and row group B(2) to processor group N(2).

One advantage of the use of a lateral distribution for a given table with the approach described herein is that it may be defined independently of any other tables. This makes it easier to load the given table into the nodes. If desired, the given table may also be retained in the nodes after the join has completed, for example to perform a different join with a separate table (rather than having to re-load the table with a different distribution).

Furthermore, if two tables in a join condition both have a lateral distribution, with one having a vertical distribution and one having a horizontal distribution, these two distributions can be made orthogonal (hence the nomenclature of horizontal and vertical), such that any given combination of rows from the two tables will appear on one and only one node (as required for the join to be performed properly). Note that in such a situation, the number of groups for the second table (e.g. table B) has to correspond to the number of nodes per group for the first table (e.g. table A) and vice versa. Therefore, the parameters of the lateral distribution for the second table are dependent on the parameters of the lateral distribution of the first table.

Table 2 illustrates another distribution of rows to the nodes for a join between table A and table B. In the example of Table 2, table A has the same lateral distribution as shown in Table 1, but table B no longer has a lateral distribution. This can be seen in that rows b1–b3 are located on node N1 and also on nodes N3 and N5, but node N3 additionally includes rows b4 and b5, while node N5 additionally includes row b4. Nevertheless, the distribution of Table 2 still satisfies the condition that each combination of rows is located on one and only one node.

TABLE 2

|    | a1 | a2 | a3 | a4 | a5 | a6 | a7 | a8 |
|----|----|----|----|----|----|----|----|----|
| b1 | N1 | N1 | N1 | N3 | N3 | N5 | N5 | N5 |
| b2 | N1 | N1 | N1 | N3 | N3 | N5 | N5 | N5 |
| b3 | N1 | N1 | N1 | N3 | N3 | N5 | N5 | N5 |
| b4 | N2 | N2 | N2 | N3 | N3 | N5 | N5 | N5 |
| b5 | N2 | N2 | N2 | N3 | N3 | N6 | N6 | N6 |
| b6 | N2 | N2 | N2 | N4 | N4 | N6 | N6 | N6 |
| b7 | N2 | N2 | N2 | N4 | N4 | N6 | N6 | N6 |
| b8 | N2 | N2 | N2 | N4 | N4 | N6 | N6 | N6 |

Table 3 illustrates another distribution of rows to the nodes for a join between table A and table B. In the example of Table 3, neither table A nor table B has a lateral distribution. Nevertheless, the distribution of Table 3 still satisfies the condition that each combination of rows is located on one and only one node.

TABLE 3

|    | a1 | a2 | a3 | a4 | a5 | a6 | a7 | a8 |
|----|----|----|----|----|----|----|----|----|
| b1 | N1 | N1 | N4 | N4 | N4 | N4 | N4 | N4 |
| b2 | N1 | N1 | N4 | N4 | N4 | N4 | N4 | N4 |
| b3 | N1 | N1 | N3 | N3 | N3 | N3 | N5 | N5 |
| b4 | N1 | N1 | N3 | N3 | N3 | N3 | N5 | N5 |
| b5 | N2 | N2 | N2 | N2 | N6 | N6 | N5 | N5 |
| b6 | N2 | N2 | N2 | N2 | N6 | N6 | N5 | N5 |
| b7 | N2 | N2 | N2 | N2 | N6 | N6 | N5 | N5 |
| b8 | N2 | N2 | N2 | N2 | N6 | N6 | N5 | N5 |

Although not using a lateral distribution for the allocation of the rows may make it more complicated to determine the appropriate row allocations, it can also allow greater flexibility. For example, if table A has a lateral distribution across M groups and table B has a lateral distribution across N groups, then a total of MN nodes are involved. However, such an allocation may not be able to utilise all available nodes (for example if the number of available nodes is prime). In contrast, an allocation which is not based on a lateral distribution is not limited to the use of MN nodes.

The use of a distribution such as shown in Table 3 may also allow improved matching of node processing and/or storage capabilities. For example, the lateral distributions may be most suited to a homogeneous set of nodes (or subsets of nodes), while the distribution of Table 3 may allow more flexibility where the nodes are more heterogeneous.

There are various workload factors that may be considered when allocating rows to nodes. For example, the processing and/or storage capabilities may vary across the set of nodes. In addition, the processing to be performed may be data-dependent in a manner that is at least partly predictable. For example, in the join based on the customer-order table, there may be a scheduled delivery date and time for all orders in the order table, and some customers may have expressed delivery preferences in the customer table (e.g. only deliver at weekends). The join may include checking for compatibility between the scheduled order time and the customer preferences, but this check only needs to be performed for customer entries where such a customer preference is provided. Thus the processing requirement for rows with a customer delivery preference may be higher than for rows without a customer delivery preference, and this may be taken into consideration for the node allocations.

Although Tables 1-3 are all nominally based on 6 nodes, in practice it may be that some of these nodes are not required, dependent upon the particular join. For example, with reference to Table 1, it may be known that any combination of rows a6–a8 from table A with rows b1–b3 from table B can never satisfy the join condition. This might arise as previously discussed, where rows a6–a8 are selected to represent high value orders, while rows b1–b3 are selected to represent customers with low levels of remaining credit. In such a situation, the combinations of rows a6–a8 from table A with rows b1–b3 from table B can be regarded as inactive, thereby allowing the join to be completed using only 5 nodes. The identification of inactive combinations therefore reduces the number of physical nodes needed to perform a join. Thus in the example of Table 1, this allocation of tables A and B is based on the existence of 6 (nominal) nodes, but in practice the join can be completed using only 5 real or operational (physical) nodes.

Although the node allocations of Tables 1-3 are based on a two-dimensional grid, reflecting the two tables to be joined together, it will be appreciated that the approach can be extend to higher dimensions to join more tables together. For example, a three-dimensional grid could be used to join three tables, a four-dimensional grid to join four tables, and so on. In 3-dimensions, each node would occupy a cuboid of the grid (rather than a rectangle as in Tables 1-3), and so on for higher dimensions.

As a very basic example of 3-dimensional join of tables A, B and C across nodes N1, N2 . . . N8, the following allocations might be made:

N1: $a_1 a_2 b_1 b_2 c_1 c_2$

N2: $a_1 a_2 b_3 b_4 c_1 c_2$

N3: $a_1 a_2 b_1 b_2 c_3 c_4$

N4: $a_1 a_2 b_3 b_4 c_3 c_4$

N5: $a_3 a_4 b_1 b_2 c_1 c_2$

N6: $a_3 a_4 b_1 b_2 c_3 c_4$

N7: $a_3 a_4 b_3 b_4 c_1 c_2$

N8: $a_3 a_4 b_3 b_4 c_3 c_4$

Note that this allocation is based on three separate lateral distributions for table A, table B, and table C.

In practice the use of higher dimensions may be limited, in that the storage requirements for an N-dimensional join increase linearly with N, while the processing requirements increase exponentially with N. Thus higher-dimensional joins are more likely to be constrained by processing limitations than by storage limitations, and hence are less amenable to improvement by refining the node allocation as described herein.

FIG. 1 is a schematic diagram of a database 50 and a distributed processing system 15 in accordance with one embodiment of the invention. The distributed system 15 includes nodes 20A, 20B, 20C, and 20D. The database 50 includes table A 80A, table B 80B, and table C 80C.

Figure 2:
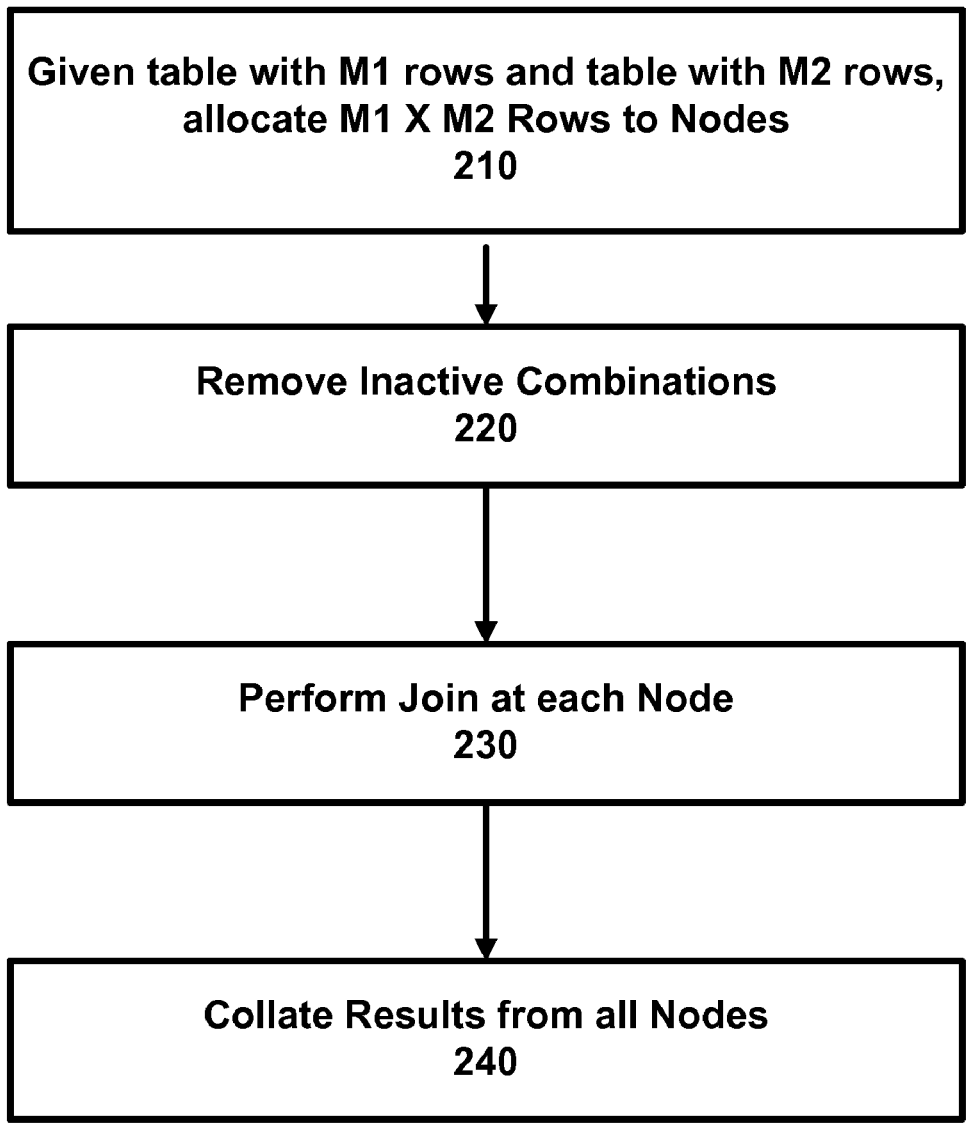
FIG. 2 is a flowchart showing a method for performing a join operation in accordance with one embodiment of the invention.

FIG. 2 is a high-level flowchart illustrating a method for performing a join operation in accordance with one embodiment of the invention. The join operation may represent any form of join condition (e.g. theta join, equi-join, natural join, etc). The method commences with the allocation of rows from the tables to the nodes (210). As discussed above, for each table this allocation can be based on a lateral or some other distribution, and can take into consideration factors such as:
(a) the processing and/or storage capabilities of the various nodes,
(b) the number of available nodes,
(c) the size and/or dimensions of the tables to be joined, and/or
(d) the properties of the data in the tables to be joined.
(e) the properties of the join condition.

The allocation satisfies the conditions that each row combination is located on one and only one processing node, and each node receives only a subset (rather than all) the data from each table involved in the join.

Before the join is actually attempted, the method of FIG. 2 proceeds to identify and eliminate inactive row combinations (220). These are row combinations for which it is known in advance that the join condition cannot be satisfied. This possibility generally arises where the distribution or allocation of the data involves a hash function. However, unlike for a conventional join via a hash distribution, there is no limitation to equi-joins. Furthermore, a given row is not limited to being stored on a single node, but rather at least some of the rows are stored on multiple nodes (subject as above to the condition that any given combination of rows is only present on a single node).

Note that if a node has only been allocated inactive row combinations, then the storage and processing resources of that node can be re-allocated to other combinations. Likewise, even if only some of the row combinations allocated to a particular node are identified as inactive (and then eliminated), it may be desirable to allocate further row combinations to this node to provide better load balancing across the set of nodes. Thus in some situations, there may be one or more iterations through steps 210 and 220 to refine the node allocations in view of any inactive combinations. In other implementations, steps 210 and 220 may be combined into a single operation, whereby the initial allocation allows for the possibility of inactive combinations. For example, the allocation may be based on a total of N(L) logical nodes, but allowing for the fact that N(I) of these nodes will have only inactive combinations, so that only N(P)=N(L)-N(I) physical nodes are actually needed.

It will be appreciated that in other embodiments, step 220 may be omitted. This might be appropriate for example where the row allocations within the selected distributions are made on a random basis, in which case any inactive combinations would be scattered across the various nodes (and would not be directly detectable in advance).

The method now proceeds to perform the join at each node (230), and the results for the join operation are collated across the nodes to obtain the final result (240). Note that in some situations, the join operation may only represent an intermediate step in the desired processing, with further processing then to be performed on the joined table. In such circumstances, it may be appropriate to perform the further processing on the individual nodes prior to collating the overall results. For example, the final desired result may be the sum of a column in the joined table, and each node might determine the sum for the portion of the joined table that it has determined. The final result would then be obtained by collecting and adding the sums determined by each individual node (rather than assembling a complete joined table from the various nodes).

The software components described herein may comprise program instructions and/or data instructions on some fixed, non-volatile storage, such as a hard disk or flash memory. These instructions and/or data structures can then be loaded for use into random access memory (RAM) for execution and use by a system processor, an application specific integrated circuit (ASIC), or by any other such device. Rather than being stored on a hard disk or other fixed device, part or all of the program instructions and/or data structures may also be stored on a removable storage medium, such as an optical (CD ROM, DVD, etc), magnetic (floppy disk, tape, etc), or semiconductor (removable flash memory) device. Alternatively, the program instructions and/or data structures may be downloaded via a network, for example, a local area network (LAN), the Internet, and so on.

In conclusion, a variety of particular embodiments have been described in detail herein, but it will be appreciated that this is by way of illustration only. The skilled person will be aware of many further potential modifications and adaptations that fall within the scope of the claimed invention and its equivalents.

The invention claimed is:

1. A method of distributing across a plurality of P processing nodes a database join operation between a first table having a total of M1 rows and a second table having a total of M2 rows, wherein M1 and M2 are integers, wherein said join operation involves forming K combinations of rows from the first and second tables, where K is formed from the integer multiplication of M1 and M2 such that K=M1×M2, wherein said join operation comprises a join condition other than an equi-join, the method comprising:
    allocating across the plurality of processing nodes the K combinations of rows from the first and second tables, wherein each node stores a subset of said M1 rows from the first table and a subset of said M2 rows from the second table, such that each of said M1 rows is stored on more than one but less than P nodes and each of said M2 rows is stored on more than one but less than P nodes, and wherein each of said K combinations is present on one of said nodes;
    performing for each processing node the join operation in respect of all combinations of rows from the subsets of rows allocated to that processing node; and
    collating results across all the processing nodes to complete the join operation,
    wherein the processing nodes are logically configured in a rectangular grid, and the M1 rows from the first table are allocated in accordance with a lateral distribution, such that all the processing nodes in a row of the grid are allocated the same subset of rows from the first table, and
    wherein the M2 rows from the second table are allocated in accordance with a lateral distribution orthogonal to the first table, such that all the processing nodes in a column of the grid are allocated the same subset of rows from the second table.

2. The method of claim 1, wherein rows are 2 assigned into the subsets by a random division of each table.

3. A method of distributing across a plurality of P processing nodes a database join operation between N tables, each table having a respective total of M(k) rows (k=I, ... N), where M(k) is an integer for all values of k (=I, ... N), wherein said join operation involves forming K combinations of rows from the N tables, where K is formed from the integer multiplication of M(k) for all values of k (=I, ... N), such that K=M(1)×M(2)×M(3) ... M(N), wherein said join operation comprises a join condition other than an equi-join, the method comprising:
    allocating across the plurality of processing nodes the K combinations of rows from the N tables, wherein each node is allocated a subset of rows from each table, such that each of said M(1) rows is stored on more than one but less than P nodes and each of said M(2) rows is stored on more than one but less than P nodes, and wherein each of the K combinations is present on one of said nodes, and performing for each processing node the join operation in respect of all combinations of rows from the subsets of rows allocated to that processing node; and collating results across all the processing nodes to complete the join 18 operation, wherein the processing nodes are logically configured in a N-dimensional grid, and the M(1) rows from a first table are allocated in accordance with a lateral distribution, such that all the processing nodes in a row of the grid are allocated the same subset of rows from the first table, and wherein the M(2) rows from a second table are allocated in accordance with a lateral distribution orthogonal to the first table, such that all the processing nodes in a column of the grid are allocated the same subset of rows from the second table.

4. A computer program product comprising instructions on a medium that when executed implement a method of distributing across a plurality of P processing nodes a database join operation between a first table having a total of M1 rows and a second table having a total of M2 rows, where M1 and M2 are integers, wherein said join operation involves forming K combinations of rows from the first and second tables, where K is formed from the integer multiplication of M1 and M2 such that K=M1×M2, wherein said join operation comprises a join condition other than an equi-join, the method comprising:

allocating across the plurality of processing nodes the K combinations of rows from the first and second tables, wherein each node stores a subset of said M1 rows from the first table and a subset of said M2 rows from the second table, such that each of said M1 rows is stored on more than one but less than P nodes and each of said M2 rows is stored on more than one but less than P nodes, and wherein each of said K combinations is present on one of said nodes;

performing for each processing node the join operation in respect of all 17 combinations of rows from the subsets of rows allocated to that processing node; and collating results across all the processing nodes to complete the join operation, wherein the processing nodes are configured in a rectangular grid, and the M1 rows from the first table are allocated in accordance with a lateral distribution, such that all the processing nodes in a row of the grid are allocated the same subset of rows from the first table, and wherein the M2 rows from the second table are allocated in accordance with a lateral distribution orthogonal to the first table, such that all the processing nodes in a column of the grid are allocated the same subset of rows from the second table.

5. The computer program product of claim 4, wherein rows are assigned into subsets on a random basis.

6. An apparatus comprising:

a plurality of P processing nodes;

a database management system for distributing across the plurality of processing nodes a database join operation between a first table having a total of M1 rows and a second table having a total of M2 rows, where M1 and M2 are integers, wherein said join operation involves forming K combinations of rows from the first and second tables, where K is formed from the integer multiplication of M1 and M2 such that K=M1×M2, wherein said join operation 9 comprises a join condition other than an equi-join, the database management system including:

a mechanism configured to allocate across the plurality of processing nodes the K combinations of rows from the first and second tables, wherein each node stores a subset of said M1 rows from the first table and a subset of said M2 rows from the second table, such that each of said M1 rows is stored on more than one but less than P nodes and each of said M2 rows is stored on more than one but less than P nodes, such that each of said M1 rows is stored on more than one but less than P nodes and each of said M2 rows is stored on more than one but less than P nodes, and wherein each of said K combinations is present on one of said nodes;

a mechanism configured to perform for each processing node the join operation in respect of all combinations of rows from the subsets of rows allocated to that processing node; and a mechanism configured to collate results across all the processing nodes to complete the join operation, wherein the processing nodes are configured in a rectangular grid, and the M1 rows from the first table are allocated in accordance with a lateral distribution, such that all the processing nodes in a row of the grid are allocated the same subset of rows from the first table, and wherein the M2 rows from the second table are allocated in accordance with a lateral distribution orthogonal to the first table, such that all the processing nodes in a column of the grid are allocated the same subset of rows from the second table.

\* \* \* \* \*